United States Patent
Alfano et al.

(10) Patent No.: US 11,076,016 B1
(45) Date of Patent: Jul. 27, 2021

(54) SYSTEMS AND METHODS FOR CACHING CONTENT IN A WIRELESS COMMUNICATION NETWORK

(71) Applicant: Verizon Patent and Licensing Inc., Basking Ridge, NJ (US)

(72) Inventors: Ralph M. Alfano, Mount Kisco, NY (US); Quan Zhang, Berkeley Heights, NJ (US); Carlo Thompson, Glen Gerdner, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/949,989

(22) Filed: Nov. 23, 2020

(51) Int. Cl.
*H04L 29/08* (2006.01)
*H04W 4/029* (2018.01)

(52) U.S. Cl.
CPC ........ *H04L 67/2842* (2013.01); *H04L 67/141* (2013.01); *H04W 4/029* (2018.02)

(58) Field of Classification Search
CPC ... H04L 67/2842; H04L 67/141; H04W 4/029
See application file for complete search history.

(56) References Cited

U.S. PATENT DOCUMENTS

| | | | | |
|---|---|---|---|---|
| 8,719,380 | B2* | 5/2014 | Zhu | H04L 67/06 709/219 |
| 8,838,690 | B2* | 9/2014 | Ciminiera | H04L 67/1065 709/204 |
| 10,735,369 | B2* | 8/2020 | Chalakov | G06F 16/152 |
| 10,897,493 | B2* | 1/2021 | Yang | H04L 67/18 |
| 2003/0101267 | A1* | 5/2003 | Thompson | H04L 67/10 709/227 |
| 2019/0364492 | A1* | 11/2019 | Azizi | H04W 52/0264 |

* cited by examiner

*Primary Examiner* — Michael C Lai

(57) ABSTRACT

A device may monitor a session involving a first user equipment and a network. The device may determine that content associated with the session is cacheable based on a characteristic of the content. The device may determine a status of the first user equipment. The device may select, based on the status and the characteristic, the first user equipment to cache content data associated with the content and transmit a cache message to the first user equipment. The cache message may be configured to cause the first user equipment to cache the content data in a local data structure of the first user equipment. The device may perform an action associated with causing the first user equipment to provide the content to a second user equipment that requests the content via the network.

20 Claims, 8 Drawing Sheets

SYSTEMS AND METHODS FOR CACHING CONTENT IN A WIRELESS COMMUNICATION NETWORK

BACKGROUND

In a multi-access edge computing (MEC) environment, computing is enabled by a network architecture that provides computing capabilities, to a user device, via computing devices at or near an edge of a network (e.g., a wireless communication network). Accordingly, because a MEC environment may provide computing at or near the edge of the network, increased performance may be achieved over networks that may be topologically and/or physically farther or outside the providers network from a user device than a MEC environment. Such increased performance may be achieved in the MEC environment due to less traffic and/or congestion between a user device and the computing platform, less latency (due to the closer proximity), increased flexibility (due to a greater amount of computing platforms), resource availability, and/or the like.

DETAILED DESCRIPTION OF PREFERRED EMBODIMENTS

Figure 1A:
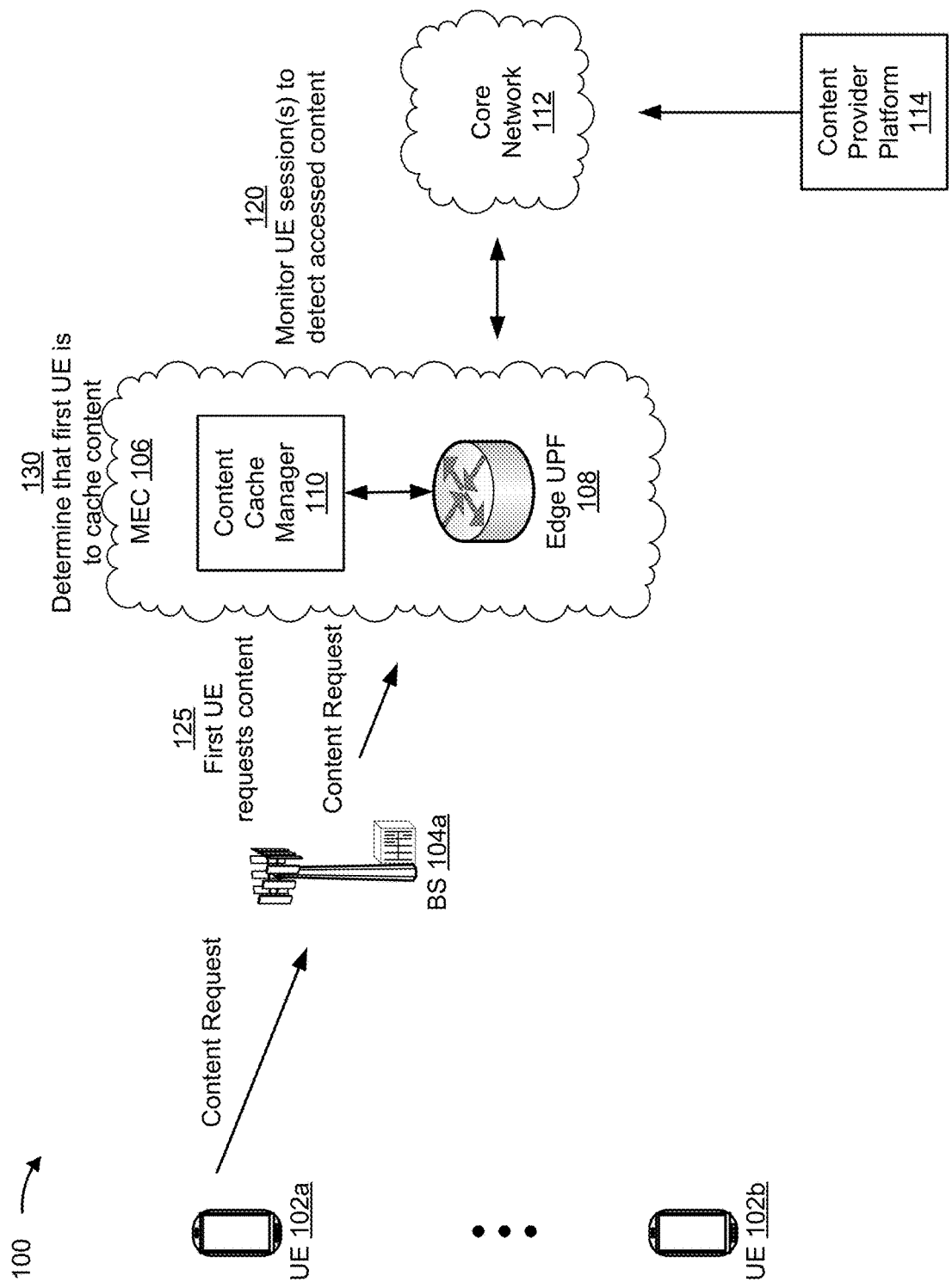
FIGS. 1A-1D are diagrams of one or more examples associated with caching content in a wireless communication network.

The following detailed description of example implementations refers to the accompanying drawings. The same reference numbers in different drawings may identify the same or similar elements.

A user equipment (UE) may transmit a request for content of a content provider. The request may be routed through a radio access network (RAN) to a server associated with the content provider. In some instances, the content may correspond to content cached by (or stored in) the server and the server may correspond to a server that is closest to the UE out of a plurality of servers associated with the content provider. As an example, the server may be included in a multi-access edge computing (MEC) environment associated with the UE.

Providing the cached content from the server (closest to the UE) addresses issues relating to latency. For example, the server may provide a faster delivery of the content than a delivery of the content by other servers associated with the content provider (e.g., because the content may be routed from the other servers through the RAN, through a core network, and/or through a public cloud environment prior to delivery to the UE). Additionally, providing the cached content from the server may reduce an amount of traffic directed to the other servers. However, the storage capacity of the server may be reduced as additional content is cached by the server. In some instances, the server may reach full capacity and may be unable to cache additional content. As a result, the UE may experience latency when requesting additional content.

Some implementations described herein enable a first UE to cache content downloaded by the first UE and to provide the content to a second UE that requests the same content. For example, a device (e.g., a content cache manager) may monitor a session involving a first UE and a network; determine that content associated with the session is cacheable based on a characteristic of the content; determine a status of the first UE; select, based on the status and the characteristic, the first UE to cache content data associated with the content; and transmit a cache message to the first UE. The cache message may be configured to cause the first UE to cache the content data in a local data structure of the first UE. The device may perform an action associated with causing the first UE to provide the content to a second UE that requests the content via the network.

By causing a first UE to cache content and provide the cached content to a second UE, some implementations described herein may preserve storage resources, network resources, and computer resources that a server (associated with a content provider) would have otherwise used to provide the same content to the second UE. Additionally, some implementations described may preserve computing resources, network resources, and/or other resources that a RAN, a MEC environment, and/or another network element would have otherwise used to provide content to the second UE.

FIGS. 1A-1D are diagrams of one or more examples 100 associated with caching content in a wireless communication network. As shown in FIGS. 1A-1D, example(s) 100 may include a plurality of user equipment (UEs) 102 (individually referred to as "UE 102" or collectively referred to as "UEs 102"), a plurality of base stations 104 (individually referred to as "base station 104" or collectively referred to as "base station 104"), a multi-access edge computing (MEC) 106, an edge user plane function (UPF) 108, a content cache manager 110, a core network 112, and a content provider platform 114.

As shown in FIG. 1A, and by reference number 120, content cache manager 110 may monitor UE session(s) to detect accessed content. For example, content cache manager 110 may monitor one or more UEs sessions during which content is downloaded and/or accessed by one or more UEs 102. In some implementations, content cache manager 110 may monitor the one or more UE sessions based on a request to monitor content downloaded and/or accessed by UEs 102. For example, content cache manager 110 may receive the request (to monitor content downloaded and/or accessed) from a content provider associated with the content (and/or associated with content provider platform 114), from a network provider of a network with which content cache manager 110 is associated (e.g., a network provider of core network 112), and/or from a network provider of a network with which the one or more UEs 102 are associated.

In some implementations, the one or more UEs 102 may be included in the geographical area and may transmit requests to download and/or access the content. In some implementations, the content may be associated with content provider platform 114 and the requests may be transmitted to content provider platform 114. The requests may be received by edge UPF 108 and edge UPF 108 may route the requests to content cache manager 110 to determine whether a caching function in the network (e.g., a caching function located on MEC 106, located on another MEC, and/or located in core network 112) has cached the content. If the content has been cached by the caching function, content cache manager 110 may cause the content to be provided to the one or more UEs 102 via edge UPF 108. If the content has not been cached by the caching function, content cache manager 110 may cause edge UPF 108 to route the requests to content provider platform 114, via core network 112, to obtain the content on behalf of the one or more UEs 102.

The requests may include information regarding the content downloaded and/or accessed by the one or more UEs 102. The information regarding the content may include information identifying a name (or a title) of the content, a type of the content (e.g., media, files, documents, and/or other types), a size of the content, a source of the content (e.g., a content provider associated with content provider platform 114), a network location of the content (e.g., a network location of content cache manager 110, a network location of content provider platform 114), and/or other information identifying the content.

Edge UPF 108 may transmit the information regarding the content to content cache manager 110 to enable content cache manager 110 to monitor the one or more UE sessions. In this regard, based on the information regarding the content (transmitted to content cache manager 110), content cache manager 110 may determine the type, the size, the location, and/or other information identifying the content downloaded and/or accessed by the one or more UEs 102.

As shown in FIG. 1A, and by reference number 125, a first UE may request content. For example, UE 102*a* may transmit a request for content associated with content provider platform 114. For instance, UE 102*a* may be included in the one or more UEs 102 and the request for the content may be transmitted by UE 102*a* to content provider platform 114 during the one or more UE sessions monitored by content cache manager 110.

In some implementations, the request may include information identifying UE 102*a* (e.g., an identifier of UE 102*a*, a network address associated with UE 102*a*, and/or other information that may identify UE 102*a*), information identifying the content (e.g., a name of the content and/or an identifier of the content), a network address associated with the content (e.g., a network address associated with content provider platform 114), and/or other information that may be used to obtain the content. In some implementations, the network address associated with UE 102*a* may include a private Internet Protocol Version 6 (IPv6) address and/or a private Internet Protocol Version 4 (IPv4) address.

The request may be provided to a base station (e.g., base station 104*a*). Base station 104*a* may provide the request to edge UPF 108. In some implementations, edge UPF 108 may provide the request to content cache manager 110 as part of monitoring the one or more UE sessions. Additionally, edge UPF 108 may provide the request to content cache manager 110 to enable content cache manager 110 to determine whether the content has been cached by a caching function in the network.

In this instance, assume that content cache manager 110 determines that the content has not been cached by the caching function. Content cache manager 110 may cause edge UPF 108 to provide the request to content provider platform 114 via core network 112. Based on the request, content provider platform 114 may provide the content to edge UPF 108 via core network 112. Edge UPF 108 may provide information regarding the content (e.g., obtained from content provider platform 114) and/or information regarding UE 102*a* (e.g., obtained from the request transmitted by UE 102*a*) to content cache manager 110 to enable content cache manager 110 to determine whether the content is to be cached by UE 102*a*.

As shown in FIG. 1A, and by reference number 130, content cache manager 110 may determine that the first UE is to cache the content. In some implementations, content cache manager 110 may determine whether the content is a cacheable content (e.g., content that is to be cached) based on a characteristic of the content.

Content cache manager 110 may identify the characteristic based on the information regarding the content. For example, the characteristic may comprise at least one of a type of the content (e.g., media, a file, a document, and/or another type), a quantity of content data of the content (e.g., a size of the content data), a timestamp associated with a creation of the content, a location identifier of a location that is associated with the content, a trend score associated with the content, or a network address associated with the content.

In some implementations, content cache manager 110 may determine characteristics of cacheable content based on monitoring the one or more UE sessions. For example, content cache manager 110 may determine that the content is cacheable if the type is media because (based on monitoring the one or more UE sessions) media is a type of content that is frequently downloaded/accessed. Additionally, or alternatively, content cache manager 110 may determine that the content is cacheable if the quantity of the content data satisfies a threshold quantity. The threshold quantity may be determined based on a desire to preserve computing resources, network resources, and/or other resources that would have otherwise been used to provide a large amount of data from content provider platform 114 to UE 102*a* (e.g., especially when content provider platform 114 and UE 102*a* are located in different geographical areas).

Additionally, or alternatively, content cache manager 110 may determine that the content is cacheable if the timestamp indicates that the content was recently created because (based on monitoring the one or more UE sessions) UEs 102 typically download and/or access recent content (e.g., content created within a hour, a few hours, a few days) more frequently than content that is not recent. Additionally, or alternatively, content cache manager 110 may determine that the content is cacheable if the location identifier, of the location that is associated with the content, corresponds to the geographical area within which UE 102*a* is associated (e.g., the content is cacheable if the content is related to the location and the location is included in the geographical area).

Additionally, or alternatively, content cache manager 110 may determine that the content is cacheable if the trend score satisfies a trend score threshold. The trend score may correspond to a download rate of the content. In this regard, the trend score may be indicative of a measure of popularity of the content (e.g., in the geographical area). Accordingly, if the trend score satisfies the trend score threshold, content cache manager 110 may determine that the content is cacheable. In some implementations, the trend score may be determined by content cache manager 110 based on monitoring the one or more UE sessions.

Additionally, or alternatively, content cache manager 110 may determine that the content is cacheable if the network address (associated with the content) indicates that the content is public content (as opposed to private content). For example, content cache manager 110 may determine whether the network address (e.g., a uniform resource identifier) includes information indicating that the content is public content (e.g., access to the content does not require user authentication, access to the content is not restricted by a network security device).

Assume content cache manager 110 determines, based on the characteristic of the content, that the content is cacheable. In some implementations, based on determining that the content is cacheable, content cache manager 110 may determine whether UE 102*a* is to cache content data (e.g., of the content). For example, content cache manager 110 may determine a status parameter (or a characteristic) of UE 102*a* based on the information regarding UE 102*a* (e.g., received from edge UPF 108 as explained above).

For instance, content cache manager 110 may determine whether UE 102*a* has a sufficient amount of available storage to cache the content data. For instance, content cache manager 110 may compare the quantity of the content data and a storage capacity of UE 102*a* (e.g., identified in the information regarding UE 102*a*) to determine whether UE 102*a* has a sufficient amount of available storage. Content cache manager 110 may determine that UE 102*a* is to cache the content (e.g., instead of content cache manager 110 caching the content) based on determining that UE 102 and one or more other UEs 102 are located in a same geographical area and/or based on determining a likelihood of the one or more other UEs 102 requesting the content. Additionally, or alternatively, content cache manager 110 may determine whether UE 102*a* includes the content caching application (e.g., that enables UE 102*a* to cache the content, and/or the like) based on the information regarding UE 102*a*. Content cache manager 110 may determine that UE 102*a* is to cache the content based on determining that UE 102*a* includes the content caching application.

Additionally, or alternatively, content cache manager 110 may obtain (e.g., from base station 104*a*) information identifying a mobility status of UE 102*a* and may determine whether the mobility status of UE 102*a* satisfies a stationary threshold. Content cache manager 110 may determine that UE 102*a* is to cache the content if the mobility status of UE 102*a* satisfies the stationary threshold. Additionally, or alternatively, content cache manager 110 may obtain (e.g., from base station 104*a*) information identifying a signal measurement of UE 102*a* (e.g., a measure of quality of a radio frequency signal associated with UE 102 and/or a measure of strength of the radio frequency signal). Content cache manager 110 may determine whether the signal measurement of UE 102*a* satisfies a signal measurement threshold. Content cache manager 110 may determine that UE 102*a* is to cache the content if the signal measurement of UE 102*a* satisfies a signal measurement threshold.

Additionally, or alternatively, content cache manager 110 may determine a status parameter of a network device that caches content. The network device may include content cache manager 110, a radio access network (RAN) associated with content cache manager 110, and/or another element that is capable of caching content. The status parameter of the network device may indicate whether the network device is available/capable to cache the content data based on information obtained from the network device. In this regard, when determining the status of parameter of the network device, content cache manager 110 may determine whether the network device has sufficient storage capacity to cache the content, a measure of congestion associated with the network device, a measure of latency associated with the network device, and/or other information that may affect a capability of the network device to cache content.

Figure 1B:
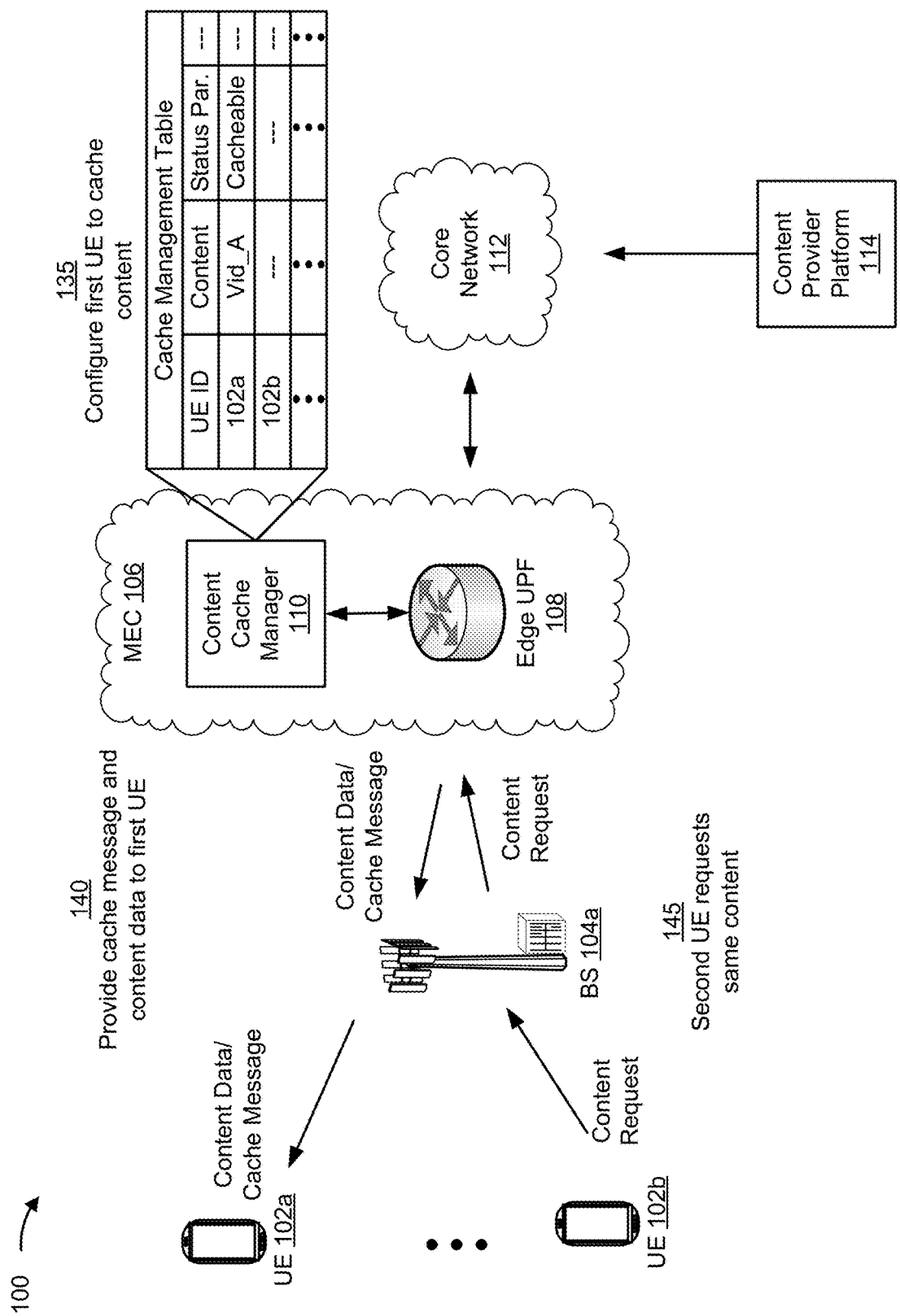

As shown in FIG. 1B, and by reference number 135, content cache manager 110 may configure first UE to cache content. For example, assume that content cache manager 110 determines that the content is cacheable and that content cache manager 110 determines that UE 102*a* is to cache the content (e.g., based on the status parameter of UE 102*a* indicating that UE 102*a* is available to cache the content data and/or the status parameter of the network device indicating that the network device is unavailable to cache the content data). Content cache manager 110 may configure UE 102*a* to cache the content data. In some implementations, content cache manager 110 may create an entry in a cache management data structure (e.g., a cache management table). The entry may include information identifying UE 102*a*, information identifying a location of UE 102*a*, information relating to the content, performance information relating to serving content (e.g., latency of fulfilling a request (for the content) from another UE 102 and a success rate associated with fulfilling the request), and/or status parameters associated with the content and/or UE 102. The information identifying UE 102*a* may include a name of UE 102*a*, an identifier of UE 102*a*, and/or a network address associated with UE 102.

The information relating to the content may include a title of the content, a name of the content, an identifier of the content, a network address from which the content was obtained, a size of the content, and/or other information relating to the content. The status parameters may include information indicating that UE 102*a* is available to cache content, information indicating an amount of time during which the content has been cached (e.g., by UE 102*a*), information indicating an amount of time remaining for UE 102*a* to cache the content, and/or other information regarding the content and/or UE 102*a*.

The cache management data structure may store similar information for one or more other UEs 102 that cache content data (e.g., based on a request from content cache manager 110). The one or more other UEs 102 may be associated with edge UPF 108 and may be associated with the geographical area. In some implementations, content cache manager 110 may use the information identifying the location of one or more UEs 102 to identify a UE 102 (of the one or more UEs 102) that is closest (geographically) to a UE 102 requesting content.

As the content is provided by UE 102*a* to one or more other UEs 102, content cache manager 110 may update the entry to include information identifying a frequency at which UE 102*a* provides the content data, a quantity of times UE 102*a* provides the content data, information identifying the one or more other UEs 102, other information regarding UE 102*a* providing the content data, and/or information indicating whether UE 102*a* has removed the content data.

As shown in FIG. 1B, and by reference number 140, content cache manager 110 may provide a cache message and the content data to the first UE. For example, based on determining that UE 102*a* is to cache the content, content cache manager 110 may provide the cache message and the content data (of the content) to UE 102*a*. The cache message may cause the content cache application of UE 102*a* to configure UE 102*a* to cache the content data (e.g., in one or more memories of UE 102*a*). The cache message may indicate at least one of information identifying a duration of time during which the content data is to be cached by UE 102*a*, information identifying a particular event that is to cause UE 102a to remove the content data from UE 102a, or a validation technique for validating transmission of the content data by UE 102a.

Content cache manager 110 may determine the duration. In some implementations, the duration may be a fixed duration (e.g., a day, a week, and/or a similar duration). Alternatively, the duration may be based on the one or more characteristics of the content. For example, the duration associated with a first quantity of the content data may exceed the duration associated with a second quantity of the content data (e.g., based on the second quantity exceeding the first quantity). Additionally, or alternatively, the duration associated with a first type of content (e.g., media) may exceed the duration associated with a second type of content (e.g., a document). Additionally, or alternatively, the duration associated with a first timestamp may exceed the duration associated with a second timestamp (e.g., based on the first timestamp being more recent than the second timestamp). Additionally, or alternatively, the duration associated with a first trend score may exceed the duration associated with a second trend score (e.g., based on the first trend score exceeding the second trend score).

In some implementations, the cache message may further include information identifying a location where the content data is to be stored (e.g., one or more memories within UE 102a), information (e.g., metadata) identifying the content data (e.g., an identifier of the content data, a name of the content data, and/or a title of the content data).

The particular event may indicate that UE 102a is to remove the content data if UE 102a is to cache other content, remove the content if allocated cache resources of UE 102a exceed a threshold, and/or a similar condition. The validation technique may include a hash algorithm, a checksum algorithm, and/or other algorithm to verify the integrity of the content data when the content data is provided UE 102a to another UE 102.

Additionally, the cache message may include information indicating that UE 102a caching activity (e.g., UE 102a caching the content data and providing the cached content data) is subject to consent of a user (or users) of UE 102a to such activity, for example, through well known "opt-in" or "opt-out" processes as can be appropriate. In some implementations, content cache manager 110 may prompt the user (or users) for consent each time content cache manager 110 transmits a cache message to UE 102a and/or each time content cache manager 110 transmits a request to UE 102a to provide cached content data. In some implementations, content cache manager 110, content provider platform 114, and/or another device or entity may provide an incentive (e.g., monetary, improved caching performance, ability to access content cached by another UE 102) to a user of UE 102a to entice the user to permit caching of content by UE 102a.

As shown in FIG. 1B, and by reference number 145, a second UE may request same content. For example, UE 102b may transmit a request for the content provided to UE 102a (e.g., cached by UE 102a). The request may include information similar to the information described above with respect to the request transmitted by UE 102a. For example, the request may include information identifying UE 102b, information identifying the content, a network address associated with the content, and/or other information that may be used to obtain the content. The request may be provided to edge UPF 108 via a base station (e.g., base station 104a). Edge UPF 108 may provide the request to content cache manager 110 to enable content cache manager 110 to determine whether the content data is to be provided to UE 102b by content provider platform 114 or by UE 102a. In some implementations, UE 102a and UE 102b may be communicatively coupled with a network via a same edge UPF (e.g., edge UPF 108).

In some implementations, content cache manager 110 may determine whether the content data is cached by UE 102a prior to determining whether the content data is to be provided to UE 102b by content provider platform 114 or by UE 102a. For example, content cache manager 110 may perform a look up operation, in the cache management data structure, using the information identifying the content. Content cache manager 110 may determine that an entry of the cache management data structure maps the information identifying the content to the information identifying UE 102a (e.g., the entry generated by content cache manager 110 as discussed above in connection with reference number 135). Accordingly, content cache manager 110 may determine that UE 102a is caching the content data based on the entry.

In some implementations, content cache manager 110 may determine whether the content data is to be provided by content provider platform 114 or by UE 102a (or by another caching entity in the network). For example, content cache manager 110 may obtain information from one or more network elements and determine, based on the information, a measure of latency associated with content provider platform 114 providing the content data to UE 102b and/or a measure of congestion associated with content provider platform 114 providing the content data to UE 102b. For instance, content cache manager 110 may determine that the content data is to be provided by UE 102a if the measure of latency exceeds a threshold measure of latency and/or if the measure of congestion exceeds a threshold measure of congestion.

Figure 1C:
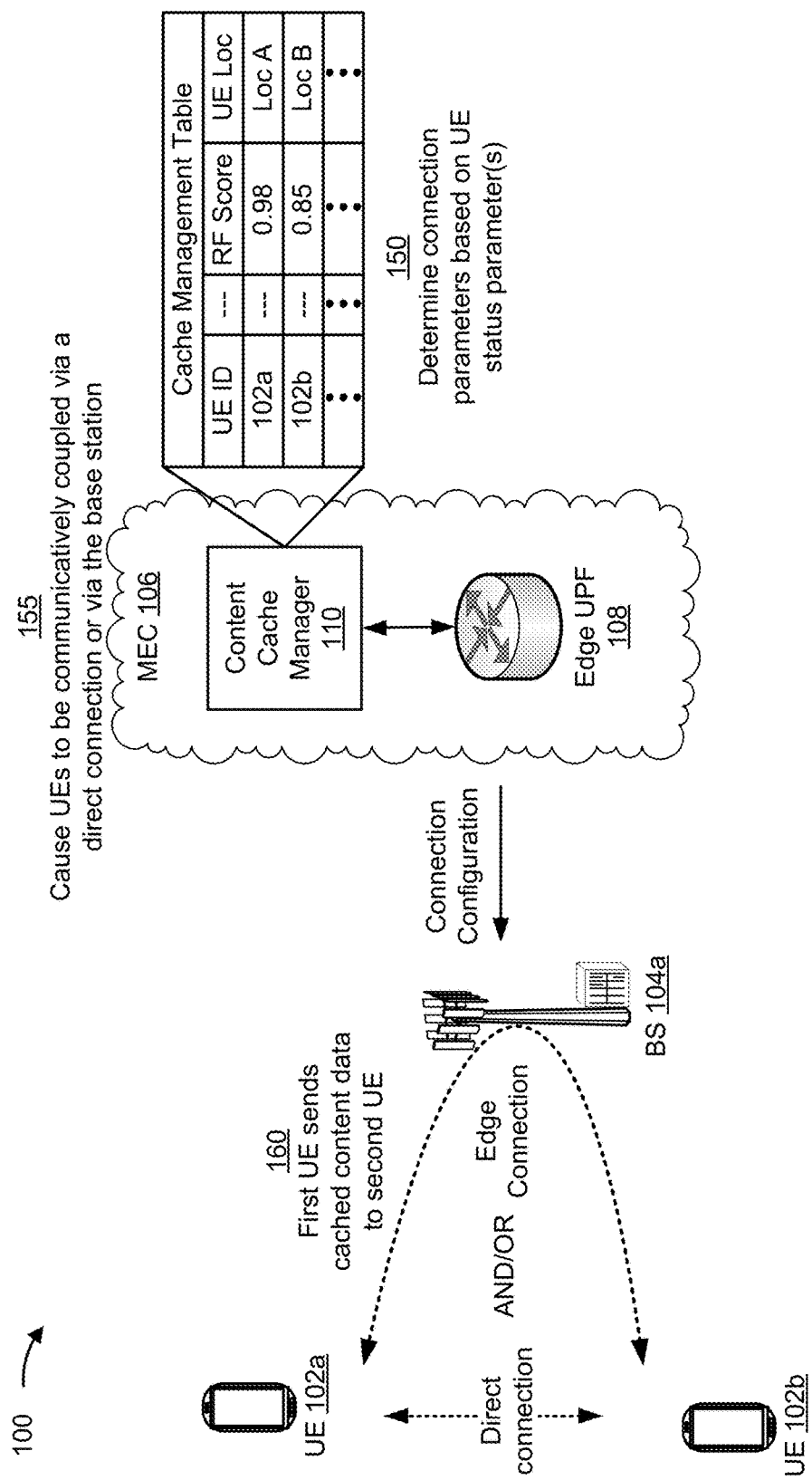

As shown in FIG. 1C, and by reference number 150, content cache manager 110 may determine connection parameters based on UE status parameter(s). For example, assume that content cache manager 110 determines that the content data is to be provided by UE 102a to UE 102b (e.g., based on the measure of latency and/or the measure of congestion discussed above). Content cache manager 110 may determine the connection parameters based on a set of status parameters associated with UE 102a and/or UE 102b.

Based on the connection parameters, content cache manager 110 may identify a type of connection via which UE 102a may provide the content data to UE 102b. For example, based on the connection parameters, content cache manager 110 may determine a direct connection between UE 102a and UE 102b (e.g., using a short-range wireless communication protocol) or an edge connection (e.g., a connection involving one or more base stations).

In some implementations, content cache manager 110 may determine the set of status parameters based on information obtained from UE 102a, UE 102b, and/or one or more network elements (e.g., base station 104a, edge UPF 108, and/or other another network element that processes requests on behalf of UE 102a and/or UE 102b).

The set of status parameters may include at least one of a mobility status of UE 102a, a mobility status of UE 102b, a radio frequency (RF) condition associated with UE 102a, a radio frequency condition associated with UE 102b, a location of UE 102b, a location of UE 102a, a base station that is serving UE 102a, and/or a base station that is serving UE 102b. As shown in FIG. 1C, content cache manager 110 may store the set of status parameters in the cache management data structure. Based on the set of parameters, content cache manager 110 may determine whether the content is to be provided to UE 102b by UE 102a via the direct connection between UE 102a and UE 102b or via the edge connection involving the one or more base stations.

In some implementations, content cache manager 110 may obtain information identifying the mobility status of UE 102a (e.g., from base station 104a) and may determine whether the mobility status of UE 102a satisfies a stationary threshold. Similarly, content cache manager 110 may obtain information identifying the mobility status of UE 102b (e.g., from base station 104a) and may determine whether the mobility status of UE 102b satisfies the stationary threshold.

If content cache manager 110 determines that the mobility status of UE 102a satisfies the stationary threshold and that the mobility status of UE 102b satisfies the stationary threshold, content cache manager 110 may determine that the content data can be provided via the direct connection. Alternatively, if content cache manager 110 determines that the mobility status of UE 102a does not satisfy the stationary threshold and that the mobility status of UE 102b does not satisfy the stationary threshold, content cache manager 110 may determine that the content data is to be provided via the edge connection.

Additionally, or alternatively, content cache manager 110 may obtain (e.g., from base station 104a) the radio frequency (RF) condition associated with UE 102a (e.g., a measure of quality of a first RF signal associated with UE 102a and/or a measure of strength of the first RF signal). Content cache manager 110 may determine whether the RF condition associated with UE 102a satisfies an RF condition threshold. Similarly, content cache manager 110 may obtain information identifying the RF condition associated with UE 102b and may determine whether the RF condition associated with UE 102b satisfies the RF condition threshold.

Content cache manager 110 may determine that the content data is to be provided via the edge connection if the RF condition associated with UE 102a does not satisfy the RF condition threshold and/or if the RF condition associated with UE 102b does not satisfy the RF condition threshold. Alternatively, Content cache manager 110 may determine that the content data can be provided via the direct connection if the RF condition associated with UE 102a satisfies the RF condition threshold and if the RF condition associated with UE 102b satisfies the RF condition threshold.

Additionally, or alternatively, content cache manager 110 may determine the location of UE 102a based on sensor data from UE 102a, information regarding an RF signal associated with UE 102a (e.g., obtained from UE 102a and/or base station 104a), a physical cell identifier of a cell associated with UE 102a, and/or information that may be used to determine the location of UE 102a. Content cache manager 110 may determine the location of UE 102b in a similar manner. Based on the location of UE 102a and the location of UE 102b, content cache manager 110 may determine a distance between UE 102a and UE 102b. Content cache manager 110 may determine whether the distance satisfies a threshold distance. Content cache manager 110 may determine that the content data is to be provided via the edge connection if the distance satisfies the threshold distance. Alternatively, content cache manager 110 may determine that the content data can be provided via the direct connection if the distance does not satisfy the threshold distance.

Additionally, or alternatively, content cache manager 110 may identify the base station that is serving UE 102a based on information obtained from UE 102a and/or obtained from the base station that is serving UE 102a and may identify the base station that is serving UE 102b based on information obtained from UE 102b and/or obtained from the base station that is serving UE 102a. Content cache manager 110 may determine that the content data is to be provided via the edge connection if content cache manager 110 determines that UE 102a and UE 102b are served by different base stations (e.g., based on information from one or more of the different base stations). In some implementations, one or more of the different base stations may determine that the content data is to be provided via the edge connection and may provide information, to content cache manager 110, indicating that the content data is to be provided via the edge connection.

In some implementations, if content cache manager 110 determines that a same base station (e.g., base station 104a) is serving UE 102a and UE 102b, content cache manager 110 may determine the distance between UE 102a and 102b (as described above). As explained above, content cache manager 110 may determine that the content data is to be provided via the edge connection if the distance satisfies the threshold distance. Alternatively, content cache manager 110 may determine that the content data is to be provided via the direct connection if the distance does not satisfy the threshold distance.

As shown in FIG. 1C, and by reference number 155, content cache manager 110 may cause UEs to be communicatively coupled via a direct connection or via the base station. For example, based on the set of status parameters, content cache manager 110 may cause UE 102a and UE 102b to be communicatively coupled via the direct connection or via the base station. For instance, content cache manager 110 may determine, based on the set of status parameters, a configuration for a connection to communicatively couple UE 102a and UE 102. As shown in FIG. 1C, content cache manager 110 may cause connection configuration information (e.g., information regarding the configuration for the connection) to be transmitted to UE 102a and UE 102b.

Based on the status parameters, the connection configuration information may include information to cause the direct connection to be established between UE 102a and UE 102b. For example, the connection configuration information may cause UE 102a and UE 102b to be communicatively coupled by establishing the direct connection according to a short-range wireless communication protocol (e.g., BLUETOOTH® Low-Energy, BLUETOOTH®, Wi-Fi, near-field communication (NFC), Z-Wave, ZigBee, and Institute of Electrical and Electronics Engineers (IEEE) 802.154) and/or according to sidelink communication protocol.

In some implementations, the connection configuration information may cause UE 102a to broadcast information associated with UE 102a and may cause UE 102b to perform a scan for the information associated with UE 102a in order to establish the direct connection. The information associated with UE 102a may be correspond to an anonymized identifier of UE 102a (e.g., different than the information identifying UE 102a obtained by content cache manager 110, as discussed above). The anonymized identifier may enable UE 102a and UE 102b to establish the direct connection without exposing the information identifying UE 102a and the information identifying UE 102b.

Additionally, or alternatively, based on the status parameters, the connection configuration information may include information to cause the edge connection to be established between UE 102a and UE 102b. For example, the connection configuration information may cause UE 102a and UE 102b to be communicatively coupled via a base station (e.g., base station 104*a*) if content cache manager 110 determines that UE 102*a* and UE 102*b* are being served by the base station.

Alternatively, if content cache manager 110 determines that UE 102*a* is served by a first base station and that UE 102*b* is served by a second base station, content cache manager 110 may configure a route between UE 102*a* and UE 102*b* that includes the first base station and the second base station. For instance, the connection configuration information may cause UE 102*a* and UE 102*b* to be communicatively coupled by establishing the connection via the route. In some implementations, when configuring the route, content cache manager 110 may determine a network slice associated with the route.

In some implementations, the connection configuration information may include information that causes a connection between UE 102*a* and UE 102*b* to be dynamically updated based on various conditions (e.g., a change in distance between UE 102*a* and UE 102*b*, a change in a base station serving UE 102*a* and UE 102*b*, a change in the signal measurement associated with UE 102*a* and UE 102*b*, and/or other similar conditions). For example, the connection configuration information may cause the direct connection to be updated to the connection via the base station if the distance between UE 102*a* and UE 102*b* satisfies the threshold distance.

Conversely, the connection configuration information may cause the connection via the base station to be updated to the direct connection if the distance between UE 102*a* and UE 102 no longer satisfies the threshold distance. Alternatively, the connection configuration information may cause the connection via the base station to be updated to the connection involving multiple base stations if UE 102*a* and/or UE 102*b* are no longer served by the same base station, and so on.

As shown in FIG. 1C, and by reference number 160, first UE may send cached content data to second UE. For example, based on receiving the connection configuration information, UE 102*a* and UE 102*b* may establish the direct connection and UE 102*a* may transmit the cached content data according to the short-range wireless communication protocol. Alternatively, based on receiving the connection configuration information, UE 102*a* and UE 102*b* may establish the direct connection and UE 102*a* may transmit the cached content data according to the sidelink communication protocol.

Alternatively, based on receiving the connection configuration information, UE 102*a* and UE 102*b* may establish the connection via the base station (e.g., base station 104*a*) and UE 102*a* may transmit the cached content data to UE 102*b* via the base station (e.g., base station 104*a*). Alternatively, based on receiving the connection configuration information, UE 102*a* and UE 102*b* may establish the connection via the route and UE 102*a* may transmit the cached content data via the route. For example, UE 102*a* may transmit the cached content data to edge UPF 108 via the first base station and edge UPF 108 may transmit the cached content data to UE 102*b* via the second base station.

In some implementations, content cache manager 110 may receive (e.g., from UE 102*b*) information (e.g., metadata) regarding the content data transmitted by UE 102*a*. Content cache manager 110 may validate the transmission of the content data using information regarding the content data and using the validation technique (discussed above). In this regard, content cache manager 110 may verify the integrity of the content data transmitted by UE 102*a*.

Figure 1D:
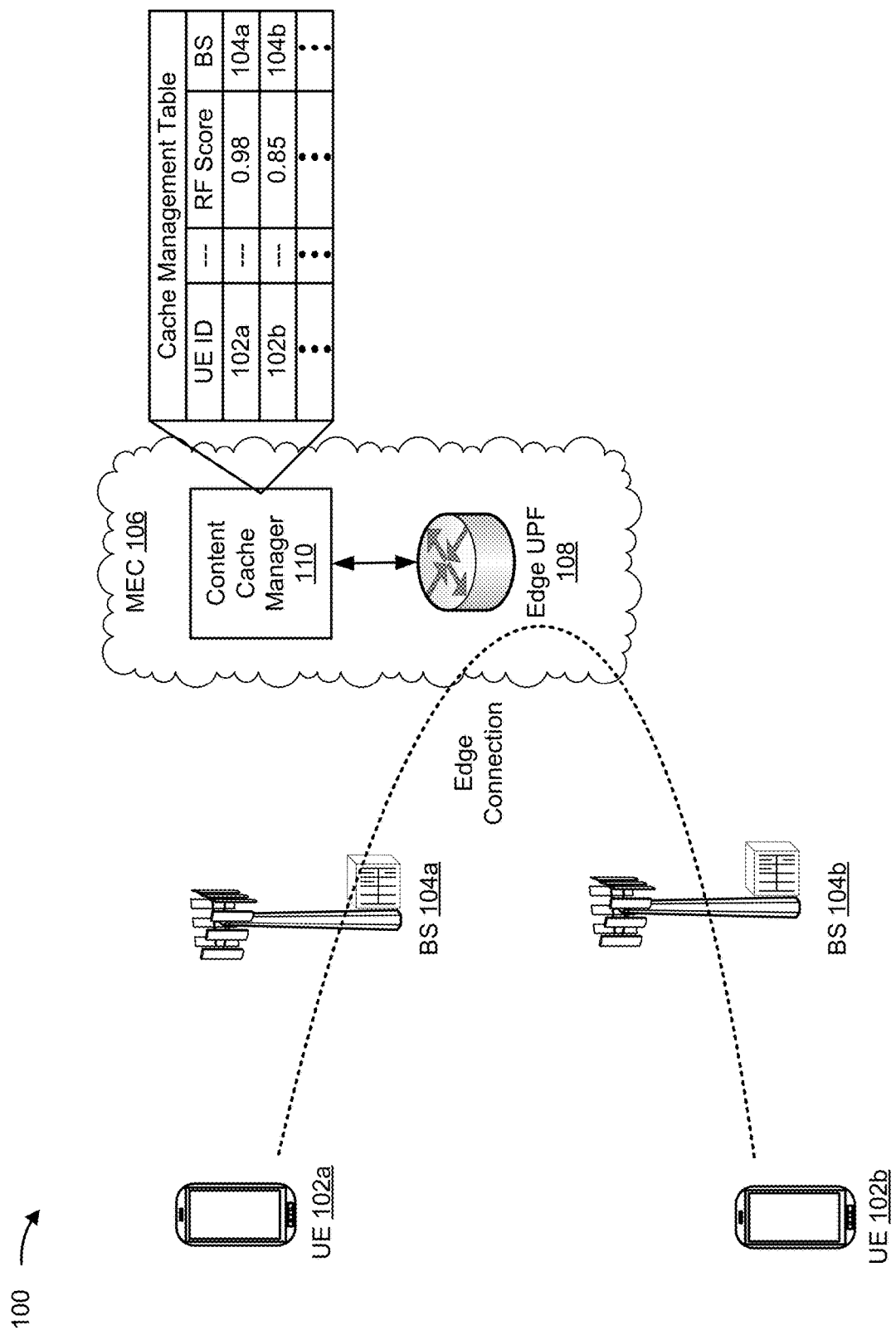

As shown in FIG. 1D, the connection between UE 102*a* and UE 102*b* may be updated. For example, assume that the connection between UE 102*a* and UE 102*b* initially involves a single base station (e.g., due to UE 102*a* and UE 102*b* being service by the single base station). Further assume that the base station is base station 104*a*. Further assume that UE 102*b* is subsequently served by a different base station (e.g., base station 104*b*) due to a handoff operation, for example. In such instance, the connection may be updated to a route between UE 102*a* and UE 102*b* that includes base station 104*a* and base station 104*b*.

In some implementations, the connection may be updated based on the connection configuration information. Alternatively, UE 102*b* may transmit, to content cache manager 110, information indicating that UE 102*b* is no longer being served by base station 104*a* and is currently served by base station 104*b*. Based on the information transmitted by UE 102*b*, content cache manager 110 may configure an updated route between UE 102*a* and UE 102*b* that includes base station 104*a* and base station 104*b*. Content cache manager 110 may update the connection configuration information accordingly and transmit the updated connection configuration information to UE 102*a* and UE 102*b* to cause UE 102*a* and UE 102*b* to be communicatively coupled by establishing a connection via the updated route.

Based on the information transmitted by UE 102*b*, content cache manager 110 may update the cache management data structure to reflect the update to the connection between UE 102*a* and UE 102*b*. For example, as shown in FIG. 1D, the cache management data structure may be updated to reflect a current base station serving UE 102*a* and a current base station serving UE 102*b*.

The number and arrangement of devices and networks shown in FIGS. 1A-1D are provided as an example. In practice, there may be additional devices and/or networks, fewer devices and/or networks, different devices and/or networks, or differently arranged devices and/or networks than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) of example implementation 100 may perform one or more functions described as being performed by another set of devices of example implementation 100.

Figure 2:
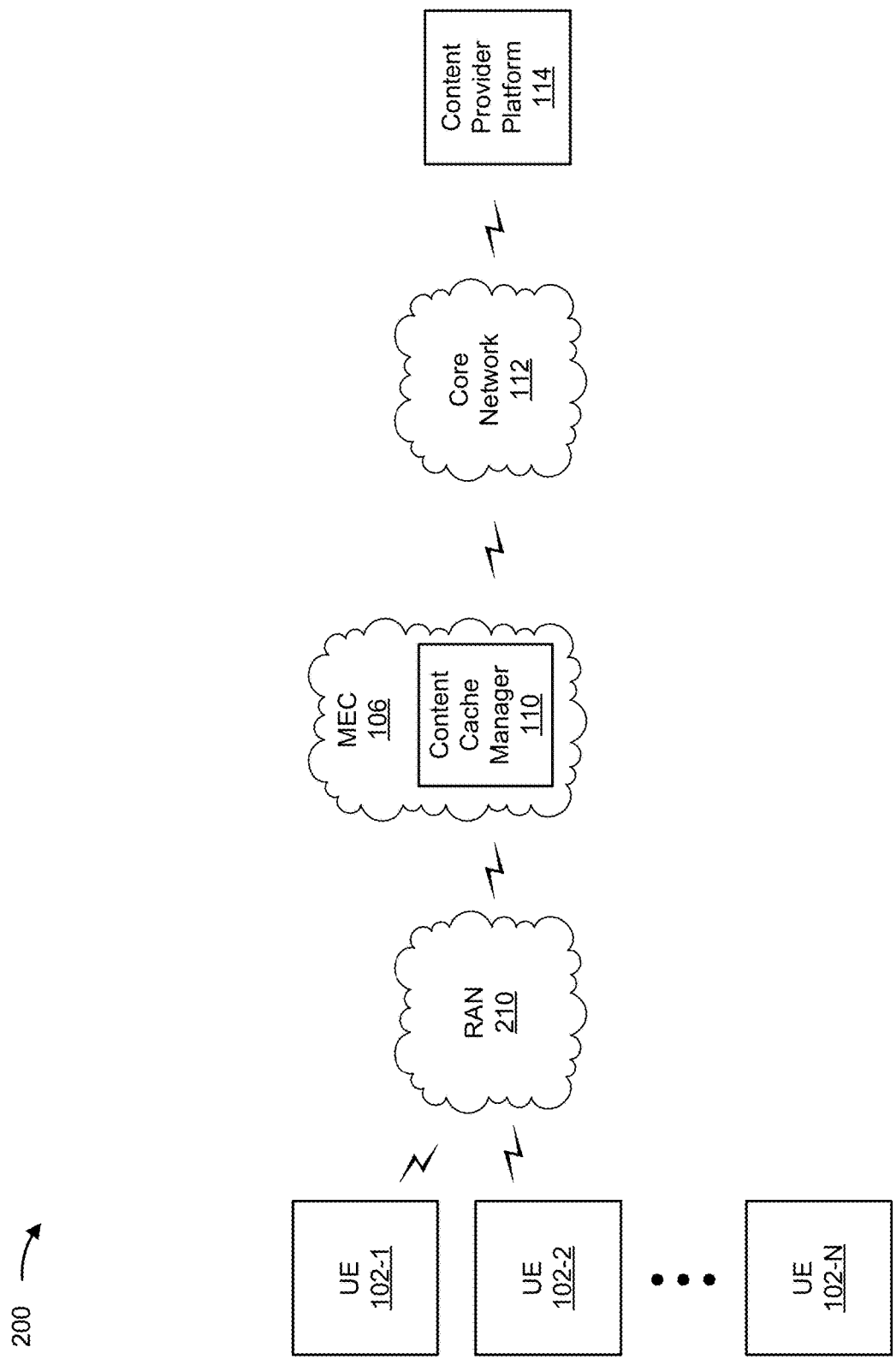
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a plurality of UEs 102 (individually referred to as "UE 102" and collectively as "UEs 102"), MEC 106, content cache manager 110, core network 112, content provider platform 114, and a radio access network (RAN) 210. Devices of environment 200 may interconnect via wired connections, wireless connections, or a combination of wired and wireless connections.

UE 102 includes one or more devices capable of communicating with RAN 210 and/or a data network (e.g., via core network 112). For example, UE 102 may include a wireless communication device, a radiotelephone, a personal communications system (PCS) terminal (e.g., that can combine a cellular radiotelephone with data processing and data communications capabilities), a smart phone, a laptop computer, a tablet computer, a personal gaming system, an autonomous vehicle, and/or a similar device.

UE 102 may be capable of communicating using uplink (e.g., UE-to-RAN) communications, downlink (e.g., RAN-to-UE) communications, and/or sidelink (e.g., UE-to-UE)

communications. In some implementations, UE 102 may include a machine-type communication (MTC) UE, such as an evolved or enhanced MTC (eMTC) UE. In some implementations, UE 102 may include an Internet of things (IoT) UE, such as a narrowband IoT (NB-IoT) UE and/or the like.

MEC 106 includes one or more devices having computing resources (e.g., processor resources, storage resources, network resources, and/or the like) that are available to process application workloads associated with UEs 102. For example, MEC 106 may include a MEC environment that can execute the application workloads as one or more virtual machines, containers, and/or the like on top of a virtualization infrastructure. Accordingly, the application workloads executed in the MEC environment can interact with the computing resources associated with the MEC environment to consume and/or provide MEC services.

In some implementations, MEC 106 may be located in an edge region of RAN 210. For example, MEC 106 may be co-located with a base station (e.g., base station 104) or located in proximity to a base station (e.g., base station 104) to process application workloads closer to UEs 102 (e.g., in terms of distance and/or latency). In some implementations, MEC 106 may be operated by a network operator associated with RAN 210 and/or a third-party provider sharing MEC resources with the network operator associated with RAN 210. In some implementations, MEC 106 may include content cache manager 110.

Content cache manager 110 may include one or more devices that cache content, that cause one or more UEs 102 to cache content downloaded by the one or more UEs 102, and/or cause the one or more UEs 102 to provide the content to one or more other UEs 102. Content cache manager 110 may configure UEs to cache content (e.g., via the content caching application). Content cache manager 110 may store, in a content management data structure, information identifying UEs 102 that cache content, information identifying the content cached by UEs 102, information identifying content stored by content cache manager 110, and/or information regarding a network associated with content cache manager 110 and/or the UEs 102.

Core network 112 includes various types of core network architectures, such as a 5G Next Generation (NG) Core, a Long-Term Evolution (LTE) Evolved Packet Core (EPC), and/or the like. In some implementations, core network 112 may be implemented on physical devices, such as a gateway, a mobility management entity, and/or the like. In some implementations, the hardware and/or software implementing core network 112 may be virtualized (e.g., through the use of network function virtualization and/or software-defined networking), thereby allowing for the use of compatible infrastructure when implementing core network 112. In this way, networking, storage, and compute resources can be allocated to implement the functions of core network 112 (described with regard to FIG. 1) in a flexible manner as opposed to relying on dedicated hardware and software to implement these functions.

Content provider platform 114 may be connected to core network 112. Content provider platform 114 may include one or more devices that provide, store, and/or maintain content. Content provider platform 114 may receive a request for the content, from a UE 102, and may cause the content to be provided to the UE 102.

RAN 210 includes one or more devices capable of communicating with UE 102 using a cellular radio access technology (RAT). For example, RAN 210 may include a base station (e.g., base station 104). RAN 210 may transfer traffic between UE 102 (e.g., using a cellular RAT), one or more other RANs 210 (e.g., using a wireless interface or a backhaul interface, such as a wired backhaul interface), and/or core network 112. RAN 210 may provide one or more cells that cover geographic areas. Some RANs 210 may be mobile base stations. Some RANs 210 may be capable of communicating using multiple RATs.

In some implementations, RAN 210 can perform scheduling and/or resource management for UEs 102 covered by RAN 210 (e.g., UEs 102 covered by a cell provided by RAN 210). In some implementations, RAN 210 may be controlled or coordinated by a network controller, which may perform load balancing, network-level configuration, and/or the like. The network controller may communicate with RAN 210 via a wireless or wireline backhaul. In some implementations, RAN 210 may include a network controller or a similar module or component.

In other words, RAN 210 may perform network control, scheduling, and/or network management functions (e.g., for other RAN 210 and/or for uplink, downlink, and/or sidelink communications of UEs 102 covered by RAN 210). In some implementations, RAN 210 may apply network slice policies to perform the network control, scheduling, and/or network management functions. In some implementations, RAN 210 may include a central unit and multiple distributed units. The central unit may coordinate access control and communication with regard to the multiple distributed units. The multiple distributed units can provide UEs 102 and/or other RANs 210 with access to a data network via core network 112.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
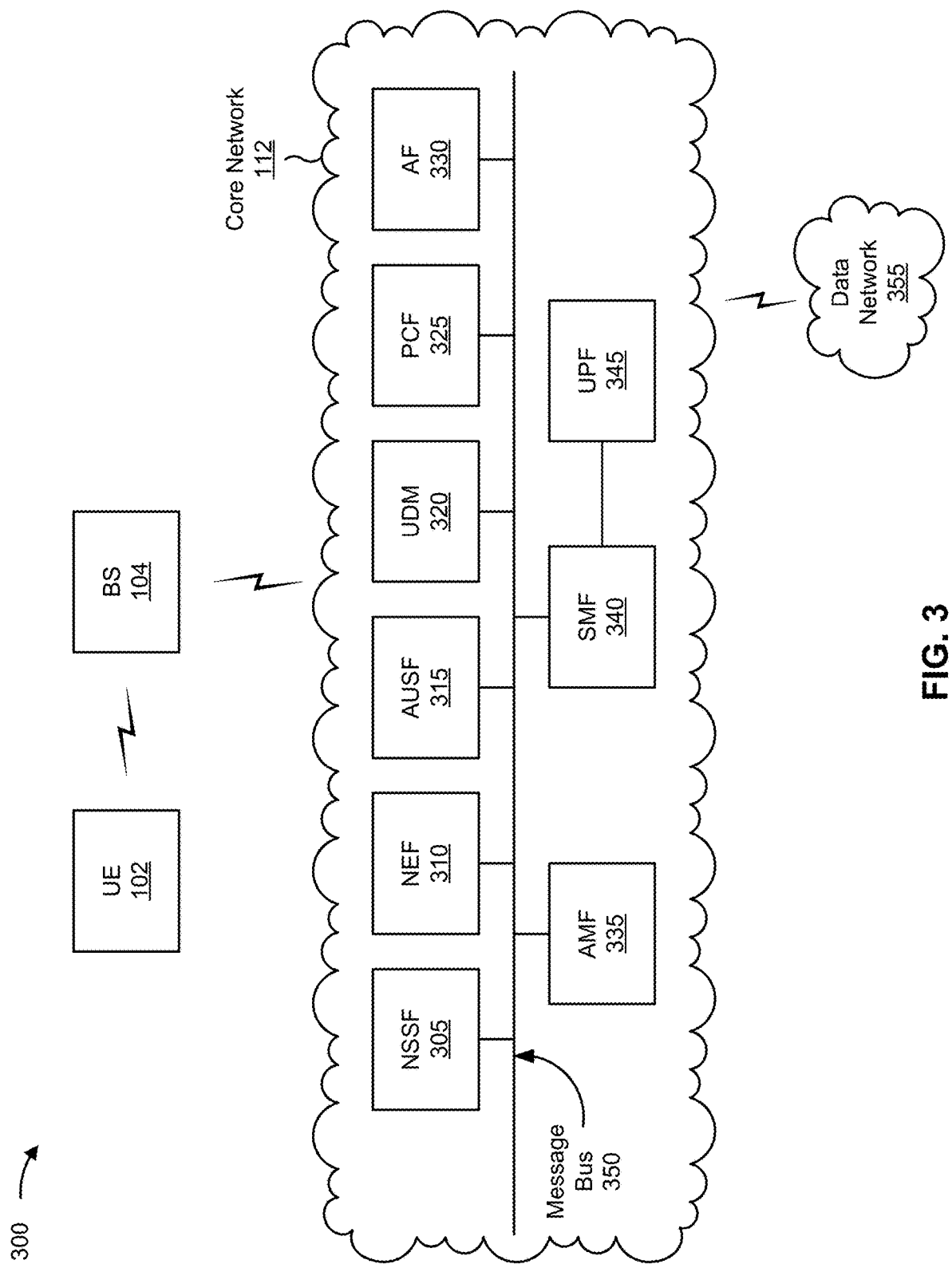
FIG. 3 is a diagram of an example environment in which systems and/or methods described herein may be implemented

FIG. 3 is a diagram of an example functional architecture of an environment 300 described herein. For example, FIG. 3 may show an example functional architecture of a 5G NG core network included in a 5G wireless telecommunications system. In some implementations, the example functional architecture may be implemented by a core network (e.g., core network 112 of FIG. 1) and/or one or more devices (e.g., a device described with respect to FIGS. 1 and 2). While the example functional architecture of environment 300 shown in FIG. 3 may be an example of a service-based architecture, in some implementations, environment 300 may be implemented as a reference-point architecture.

As shown in FIG. 3, environment 300 may include a plurality of functional elements. Environment 300 may include UE 102 (described above), base station 104, core network 112, and data network 355. As shown in FIG. 3, UE 102 (which has been described in connection with FIGS. 1A-1D) may be connected to base station 104.

Base station 104 may be connected to core network 112. Base station 104 may include a base transceiver station, a radio base station, a node B, an evolved node B (eNB), a next generation node B (gNB), a base station subsystem, a cellular site, a cellular tower (e.g., a cell phone tower, a mobile phone tower, and/or the like), an access point, a transmit receive point (TRP), a radio access node, a macrocell base station, a microcell base station, a picocell base station, a femtocell base station, or a similar type of device.

The functional elements may include, for example, a network slice selection function (NSSF) 305, a network exposure function (NEF) 310, an authentication server function (AUSF) 315, a UDM 320, a policy control function (PCF) 325, an application function (AF) 330, an access and mobility function (AMF) 335, a session management function (SMF) 340, and a user plane function (UPF) 345. These functional elements may be communicatively connected via a message bus 350, which may be comprised of one or more physical communication channels and/or one or more virtual communication channels. Each of the functional elements shown in FIG. 3 is implemented on one or more devices associated with a wireless telecommunications system, such as a device described with respect to FIG. 3.

In some implementations, one or more of the functional elements may be implemented on one or more physical devices (which may be referred to herein as "platform devices"), such as an access point, a base station, a gateway, a server, and/or the like. In some implementations, one or more of the functional elements may be implemented on one or more computing devices of a cloud computing environment associated with the wireless telecommunications system. In some implementations, environment 200 may be operatively connected to data network 355 via wired and/or wireless connections with UPF 345.

NSSF 305 may select network slice instances for UEs. By providing network slicing, NSSF 305 allows an operator to deploy multiple substantially independent end-to-end networks potentially with the same infrastructure. In some implementations, each slice may be customized for different services. NEF 310 may support the exposure of capabilities and/or events in the wireless telecommunications system to help other entities in the wireless telecommunications system discover network services and/or utilize network resources efficiently.

AUSF 315 may act as an authentication server and support the process of authenticating UEs in the wireless telecommunications system. UDM 320 may store subscriber data and profiles in the wireless telecommunications system. UDM 320 may be used for fixed access, mobile access, and/or the like, in environment 300. PCF 325 may provide a policy and charging framework that incorporates network slicing, roaming, packet processing, mobility management, and/or the like.

AF 330 may determine whether UEs provide preferences for a set of network slice policies and support application influence on traffic routing, access to NEF 310, policy control, and/or the like. AMF 335 may provide authentication and authorization of UEs. SMF 340 may support the establishment, modification, and release of communications sessions in the wireless telecommunications system. For example, SMF 340 may configure traffic steering policies at UPF 345, enforce UE IP address allocation and policies, and/or the like. AMF 335 and SMF 340 may act as a termination point for Non-Access Stratum (NAS) signaling, mobility management, and/or the like. SMF 340 may act as a termination point for session management related to NAS.

UPF 345 may serve as an anchor point for intra/inter Radio Access Technology (RAT) mobility. UPF 345 may apply rules to packets, such as rules pertaining to packet routing, traffic reporting, handling user plane QoS, and/or the like. UPF 345 may determine an attribute of application-specific data that is communicated in a communications session. Message bus 350 represents a communication structure for communication among the functional elements. In other words, message bus 350 may permit communication between two or more functional elements. Message bus 350 may be a communication bus, HTTP/2 proxy server, and/or the like.

Data network 355 includes one or more wired and/or wireless data networks. For example, data network 355 may include an IP Multimedia Subsystem (IMS), a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third-party services network, an operator services network, and/or the like, and/or a combination of these or other types of networks.

The number and arrangement of functional elements shown in FIG. 3 are provided as an example. In practice, there may be additional functional elements, fewer functional elements, different functional elements, or differently arranged functional elements than those shown in FIG. 3. Furthermore, two or more functional elements shown in FIG. 3 may be implemented within a single device, or a single functional element shown in FIG. 3 may be implemented as multiple, distributed devices. Additionally, or alternatively, a set of functional elements (e.g., one or more functional elements) of environment 300 may perform one or more functions described as being performed by another set of functional elements of environment 300.

Figure 4:
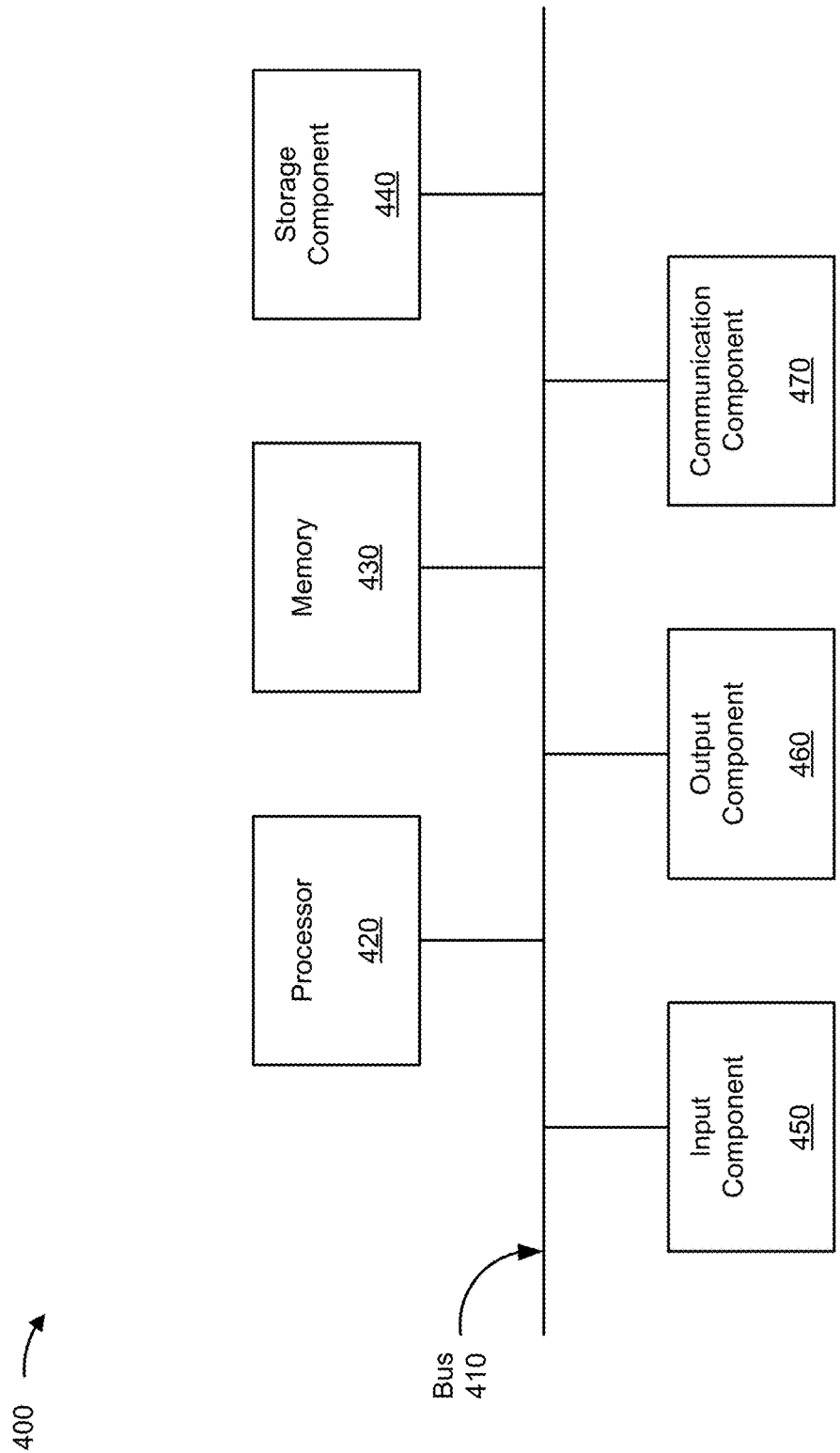
FIG. 4 is a diagram of example components of a device of FIGS. 1-3.

FIG. 4 is a diagram of example components of a device 400 of FIGS. 1-3. Device 400 may correspond to UE 102, base station 104, edge UPF 108, and content cache manager 110. In some implementations, UE 102, base station 104, edge UPF 108, and content cache manager 110 may include one or more devices 400 and/or one or more components of device 400. As shown in FIG. 4, device 400 may include a bus 410, a processor 420, a memory 430, a storage component 440, an input component 450, an output component 460, and a communication component 470.

Bus 410 includes a component that enables wired and/or wireless communication among the components of device 400. Processor 420 includes a central processing unit, a graphics processing unit, a microprocessor, a controller, a microcontroller, a digital signal processor, a field-programmable gate array, an application-specific integrated circuit, and/or another type of processing component. Processor 420 is implemented in hardware, firmware, or a combination of hardware and software. In some implementations, processor 420 includes one or more processors capable of being programmed to perform a function. Memory 430 includes a random access memory, a read only memory, and/or another type of memory (e.g., a flash memory, a magnetic memory, and/or an optical memory).

Storage component 440 stores information and/or software related to the operation of device 400. For example, storage component 440 may include a hard disk drive, a magnetic disk drive, an optical disk drive, a solid state disk drive, a compact disc, a digital versatile disc, and/or another type of non-transitory computer-readable medium. Input component 450 enables device 400 to receive input, such as user input and/or sensed inputs. For example, input component 450 may include a touch screen, a keyboard, a keypad, a mouse, a button, a microphone, a switch, a sensor, a global positioning system component, an accelerometer, a gyroscope, an actuator, and/or the like. Output component 460 enables device 400 to provide output, such as via a display, a speaker, and/or one or more light-emitting diodes. Communication component 470 enables device 400 to communicate with other devices, such as via a wired connection and/or a wireless connection. For example, communication component 470 may include a receiver, a transmitter, a transceiver, a modem, a network interface card, an antenna, and/or the like.

Device 400 may perform one or more processes described herein. For example, a non-transitory computer-readable medium (e.g., memory 430 and/or storage component 440) may store a set of instructions (e.g., one or more instructions, code, software code, program code, and/or the like) for execution by processor 420. Processor 420 may execute the set of instructions to perform one or more processes described herein. In some implementations, execution of the set of instructions, by one or more processors 420, causes the one or more processors 420 and/or the device 400 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 4 are provided as an example. Device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

Figure 5:
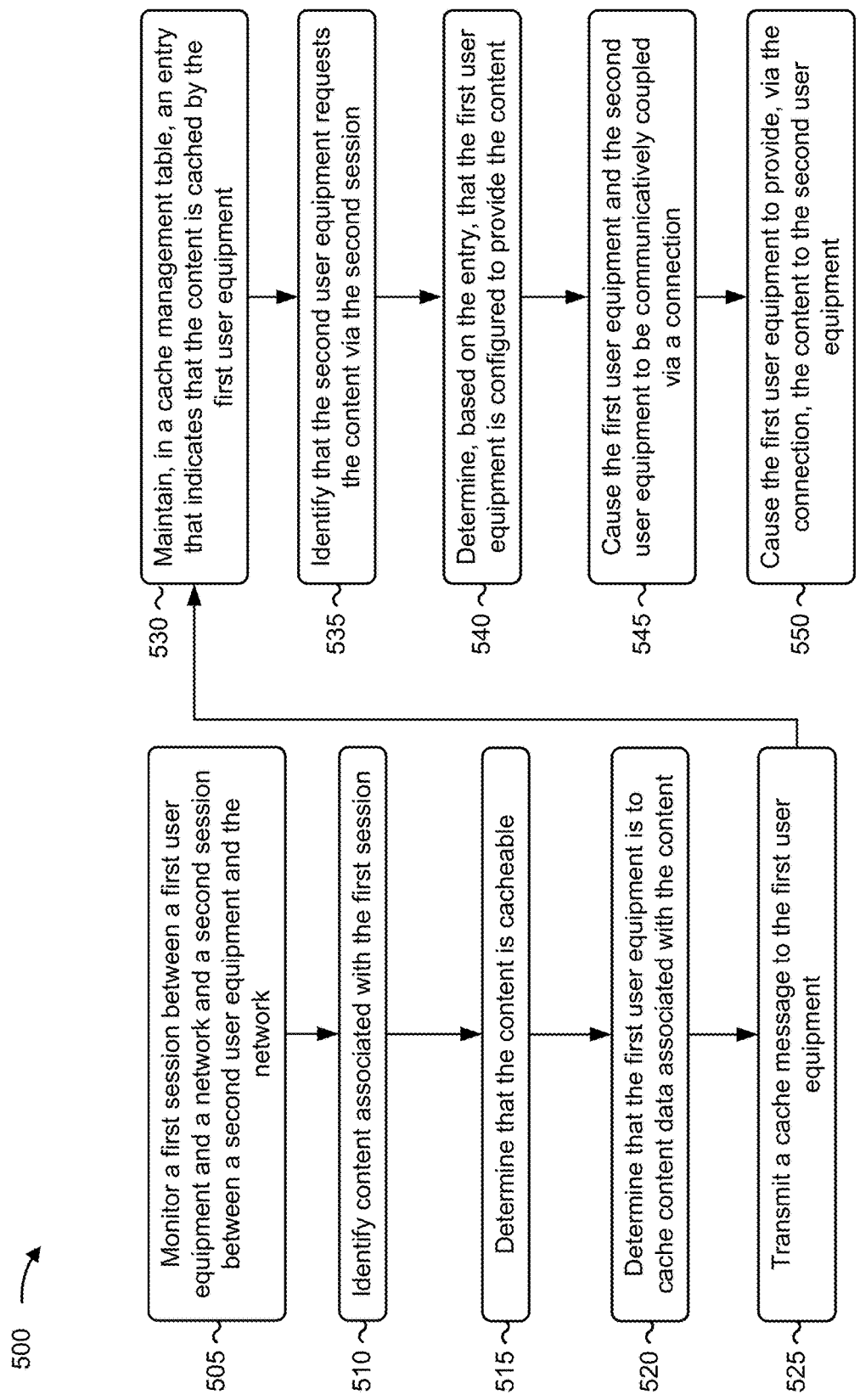
FIG. 5 is a flowchart of an example process relating to caching content in a wireless communication network.

FIG. 5 is a flowchart of an example process 500 associated with systems and methods for caching content in a wireless communication network. In some implementations, one or more process blocks of FIG. 5 may be performed by a content cache manager (e.g., content cache manager 110). In some implementations, one or more process blocks of FIG. 5 may be performed by another device or a group of devices separate from or including the content cache manager, such as a UE (e.g., UE 102), a base station (e.g., BS 104), and an edge UPF (e.g., edge UPF 108). Additionally, or alternatively, one or more process blocks of FIG. 5 may be performed by one or more components of device 400, such as processor 420, memory 430, storage component 440, input component 450, output component 460, and/or communication component 470.

As shown in FIG. 5, process 500 may include monitoring a first session between a first user equipment and a network and a second session between a second user equipment and the network (block 505). For example, the content cache manager may monitor a first session between a first user equipment and a network and a second session between a second user equipment and the network, as described above.

As further shown in FIG. 5, process 500 may include identifying content associated with the first session (block 510). For example, the content cache manager may identify content associated with the first session, as described above.

As further shown in FIG. 5, process 500 may include determining that the content is cacheable based on a characteristic of the content (block 515). For example, the content cache manager may determine that the content is cacheable based on a characteristic of the content, as described above. In some implementations, the characteristic comprises at least one of a type of the content, a quantity of the content data, a timestamp associated with a creation of the content, a location identifier of a location that is associated with the content, or a trend score associated with the content.

In some implementations, the determination that the first user equipment is to cache the cached content is based on at least one of the characteristic of the content, a status of the first user equipment that indicates that the first user equipment is available to cache the content data, or a status of an edge data structure that indicates that the edge data structure is unavailable to cache the content data.

As further shown in FIG. 5, process 500 may include determining that the first user equipment is to cache content data associated with the content (block 520). For example, the content cache manager may determine that the first user equipment is to cache content data associated with the content, as described above.

As further shown in FIG. 5, process 500 may include transmitting a cache message to the first user equipment (block 525). For example, the content cache manager may transmit a cache message to the first user equipment, wherein the cache message is configured to cause the first user equipment to cache the content data in a local data structure of the first user equipment, as described above. In some implementations, the cache message is configured to cause the first user equipment to cache the content data in a local data structure of the first user equipment.

As further shown in FIG. 5, process 500 may include maintaining, in a cache management table, an entry that indicates that the content is cached by the first user equipment (block 530). For example, the content cache manager may maintain, in a cache management table, an entry that indicates that the content is cached by the first user equipment, as described above.

As further shown in FIG. 5, process 500 may include identifying that the second user equipment requests the content via the second session (block 535). For example, the content cache manager may identify that the second user equipment requests the content via the second session, as described above.

As further shown in FIG. 5, process 500 may include determining, based on the entry, that the first user equipment is configured to provide the content to the second user equipment (block 540). For example, the content cache manager may determine, based on the entry, that the first user equipment is configured to provide the content to the second user equipment, as described above.

As further shown in FIG. 5, process 500 may include causing the first user equipment and the second user equipment to be communicatively coupled via a connection (block 545). For example, the content cache manager may cause the first user equipment and the second user equipment to be communicatively coupled via a connection, as described above.

As further shown in FIG. 5, process 500 may include causing the first user equipment to provide, via the connection, the content to the second user equipment based on the content data that is cached in the local data structure (block 550). For example, the content cache manager may cause the first user equipment to provide, via the connection, the content to the second user equipment based on the content data that is cached in the local data structure, as described above. In some implementations, the determination that the first user equipment is to cache the cached content is based on at least one of the characteristic of the content, a status of the first user equipment that indicates that the first user equipment is available to cache the content data, or a status of an edge data structure that indicates that the edge data structure is unavailable to cache the content data.

In some implementations, the cache message indicates at least one of a duration that the content data is to be cached by the first user equipment, a particular event that is to cause the first user equipment to remove the content data from the local data structure, or a validation technique for validating transmission of the content data.

In some implementations, the first user equipment and the second user equipment are communicatively coupled with the network via a same edge user plane function (UPF) of the network.

In some implementations, causing the first user equipment to provide the content to the second user equipment comprises identifying a first base station, of the network, that is communicatively coupled to the first user equipment, identifying a second base station, of the network, that is communicatively coupled to the second user equipment, and configuring a route between the first user equipment and the second user equipment that includes the first base station and the second base station, wherein the connection between the first user equipment and the second user equipment is to be established via the route.

In some implementations, causing the first user equipment to provide the content to the second user equipment comprises identifying that the first user equipment and the second user equipment are located in a same geographical area, and causing the connection to be established between the first user equipment and the second user equipment based on the first user equipment and the second user equipment being located in the same geographical area.

In some implementations, causing the first user equipment to provide the content to the second user equipment comprises determining a first location of the first user equipment and a second location of the second user equipment, determining a distance between the first location and the second location, determining that the distance is within a range associated with a short-range wireless communication protocol, and causing, based on the distance being within the range, the first user equipment and the second user equipment to establish the connection according to the short-range wireless communication protocol.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
    monitoring, by a device, a first session between a first user equipment and a network and a second session between a second user equipment and the network;
    identifying, by the device, content associated with the first session;
    determining, by the device, that the content is cacheable based on a characteristic of the content;
    determining, by the device, that the first user equipment is to cache content data associated with the content;
    transmitting, by the device, a cache message to the first user equipment,
        wherein the cache message is configured to cause the first user equipment to cache the content data in a local data structure of the first user equipment;
    maintaining, by the device and in a cache management table, an entry that indicates that the content is cached by the first user equipment;
    identifying, by the device, that the second user equipment requests the content via the second session;

causing, by the device, the first user equipment and the second user equipment to be communicatively coupled via a connection; and causing, by the device, the first user equipment to provide, via the connection, the content to the second user equipment based on the content data that is cached in the local data structure.

2. The method of claim 1, wherein the characteristic comprises at least one of:
   a type of the content;
   a quantity of the content data;
   a timestamp associated with a creation of the content;
   a location identifier of a location that is associated with the content; or
   a trend score associated with the content.

3. The method of claim 1, wherein the determination that the first user equipment is to cache the cached content is based on at least one of:
   the characteristic of the content;
   a status of the first user equipment that indicates that the first user equipment is available to cache the content data; or
   a status of an edge data structure that indicates that the edge data structure is unavailable to cache the content data.

4. The method of claim 1, wherein the cache message indicates:
   a validation technique for validating transmission of the content data.

5. The method of claim 1, wherein the first user equipment and the second user equipment are communicatively coupled with the network via a same edge user plane function (UPF) of the network.

6. The method of claim 1, wherein causing the first user equipment to provide the content to the second user equipment comprises:
   identifying a first base station, of the network, that is communicatively coupled to the first user equipment;
   identifying a second base station, of the network, that is communicatively coupled to the second user equipment; and
   configuring a route between the first user equipment and the second user equipment that includes the first base station and the second base station,
      wherein the connection between the first user equipment and the second user equipment is to be established via the route.

7. The method of claim 1, wherein causing the first user equipment to provide the content to the second user equipment comprises:
   identifying that the first user equipment and the second user equipment are included in a same geographical area; and
   causing the connection to be established between the first user equipment and the second user equipment based on the first user equipment and the second user equipment being included in the same geographical area.

8. The method of claim 1, wherein causing the first user equipment to provide the content to the second user equipment comprises:
   determining a first location of the first user equipment and a second location of the second user equipment;
   determining a distance between the first location and the second location;
   determining that the distance satisfies a threshold distance; and
   causing, based on the distance satisfying the threshold distance, the first user equipment and the second user equipment to establish the connection.

9. A device, comprising:
   one or more processors configured to:
      monitor a session involving a first user equipment and a network;
      determine that content associated with the session is cacheable based on a characteristic of the content;
      determine a status of the first user equipment;
      select, based on the status and the characteristic, the first user equipment to cache content data associated with the content;
      transmit a cache message to the first user equipment, wherein the cache message is configured to cause the first user equipment to cache the content data in a local data structure of the first user equipment; and
      perform an action associated with causing the first user equipment to provide the content to a second user equipment that requests the content via the network.

10. The device of claim 9, wherein the first user equipment is selected from a group of cache devices that include the first user equipment and a network device of the network,
   wherein the first user equipment is to be selected based on at least one of:
      the characteristic of the content;
      the status of the first user equipment indicating that the first user equipment is available to cache the content data; or
      a status of the network device indicating that the network device is unavailable to cache the content data.

11. The device of claim 9, wherein the one or more processors, when performing the action, are configured to:
   maintain, in a cache management table, an entry that indicates that the content is cached by the first user equipment,
   wherein the one or more processors are further configured to:
      identify that the second user equipment requests the content;
      determine, based on the entry, that the first user equipment is configured to provide the content to the second user equipment;
      cause the first user equipment and the second user equipment to be communicatively coupled via a connection; and
      cause the first user equipment to provide, via the connection, the content to the second user equipment based on the content data that is cached in the local data structure.

12. The device of claim 9, wherein the one or more processors, when performing the action, are configured to:
   configure a route between the first user equipment and the second user equipment via one or more base stations associated with the network; and
   cause a connection between the first user equipment and the second user equipment to be established via the route,
      wherein the connection is to permit the first user equipment to provide the content to the second user equipment by sharing the content data in the local data structure.

13. The device of claim 9, wherein the one or more processors, when performing the action, are configured to:

maintain, in a cache management table, a first entry that indicates that the content is cached by the first user equipment and that the first user equipment is communicatively coupled to a base station;

determine, based on the first entry and a second entry of the cache management table that is associated with the second user equipment, that the first user equipment and the second user equipment are both connected to the base station of the network; and cause, via the base station, a connection to be established between the first user equipment and the second user equipment.

14. The device of claim 9, wherein the one or more processors, when performing the action, are configured to:
determine a first location of the first user equipment and a second location of the second user equipment;
determine a distance between the first location and the second location;
determine that the distance satisfies a threshold distance; and
cause, based on the distance satisfying the threshold distance, the first user equipment and the second user equipment to establish a connection.

15. A non-transitory computer-readable medium storing a set of instructions, the set of instructions comprising:
one or more instructions that, when executed by one or more processors of a device, cause the device to:
receive, from a first user equipment, a request to receive content via a network;
determine that a second user equipment is caching content data associated with the content;
determine a set of status parameters associated with the first user equipment or the second user equipment;
determine, based on the set of status parameters, a configuration for a connection to communicatively couple the first user equipment and the second user equipment;
cause the first user equipment and the second user equipment to be communicatively coupled via the connection according to the configuration; and
cause the second user equipment to provide the content data to the first user equipment to permit the first user equipment to receive the content.

16. The non-transitory computer-readable medium of claim 15, wherein the one or more instructions, that cause the device to determine that the second user equipment is caching the content data, cause the device to:
look up, in a cache management table, a content identifier associated with the content;
determine that an entry of the cache management table maps the content identifier to a user equipment identifier associated with the second user equipment; and
determine that the second user equipment is caching the content data based on the entry.

17. The non-transitory computer-readable medium of claim 15, wherein the set of status parameters include at least one of:
a mobility status of the first user equipment;
a mobility status of the second user equipment;
a radio frequency condition associated with the first user equipment;
a radio frequency condition associated with the second user equipment;
a location of the first user equipment;
a location of the second user equipment;
a base station that is serving the first user equipment; or
a base station that is serving the second user equipment.

18. The non-transitory computer-readable medium of claim 15, wherein the one or more instructions, that cause the device to determine the configuration, cause the device to:
identify, based on the set of status parameters, a first base station, of the network, that is communicatively coupled to the first user equipment and a second base station, of the network, that is communicatively coupled to the second user equipment; and
configure a route between the first user equipment and the second user equipment that includes the first base station and the second base station,
wherein the first user equipment and the second user equipment are communicatively coupled by establishing the connection via the route.

19. The non-transitory computer-readable medium of claim 15, wherein the one or more instructions, that cause the device to determine the configuration, cause the device to:
determine that the first user equipment and the second user equipment are included in a same geographical area,
wherein the first user equipment and the second user equipment are communicatively coupled by establishing the connection based on the first user equipment and the second user equipment being included in the same geographical area.

20. The non-transitory computer-readable medium of claim 15, wherein the one or more instructions, that cause the device to determine the configuration, cause the device to:
determine a first location of the first user equipment and a second location of the second user equipment;
determine a distance between the first location and the second location; and
determine that the distance satisfies a threshold distance,
wherein the first user equipment and the second user equipment are communicatively coupled by establishing the connection based on the distance satisfying the threshold distance.

* * * * *